(12) United States Patent
Arora et al.

(10) Patent No.: US 8,451,489 B1
(45) Date of Patent: May 28, 2013

(54) CONTENT-AWARE METHOD FOR SAVING PAPER AND INK WHILE PRINTING A PDF DOCUMENT

(75) Inventors: Kapil Arora, New Delhi (IN); Naveen Goel, Uttar Pradesh (IN); Amit Mittal, Uttar Pradesh (IN); Hemant Virmani, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 513 days.

(21) Appl. No.: 12/849,519

(22) Filed: Aug. 3, 2010

(51) Int. Cl.
*G06K 15/00* (2006.01)

(52) U.S. Cl.
USPC ......... 358/1.18; 358/1.13; 715/243; 715/247; 715/251

(58) Field of Classification Search
USPC .......... 358/1.2, 1.18, 450, 540, 452; 715/251, 715/252, 253, 209, 223, 247
See application file for complete search history.

(56) References Cited

U.S. PATENT DOCUMENTS

| | | | |
|---|---|---|---|
| 6,128,655 A | 10/2000 | Fields et al. | |
| 6,266,684 B1 | 7/2001 | Kraus et al. | |
| 7,237,188 B1 | 6/2007 | Leung | |
| 7,366,981 B2 * | 4/2008 | Wu et al. | 715/234 |
| 7,599,094 B2 | 10/2009 | Sellers et al. | |
| 7,680,858 B2 | 3/2010 | Poola et al. | |
| 8,024,412 B2 | 9/2011 | McCann et al. | |
| 8,085,421 B2 * | 12/2011 | Hamilton et al. | 358/1.15 |
| 8,305,653 B2 * | 11/2012 | Austin et al. | 358/474 |
| 8,397,155 B1 * | 3/2013 | Szabo | 715/209 |
| 2002/0135800 A1 | 9/2002 | Dutta | |
| 2003/0163537 A1 | 8/2003 | Rohall et al. | |
| 2004/0019699 A1 | 1/2004 | Dam et al. | |
| 2004/0044735 A1 | 3/2004 | Hoblit | |
| 2004/0068698 A1 * | 4/2004 | Wu et al. | 715/525 |
| 2004/0205607 A1 * | 10/2004 | Kim et al. | 715/517 |
| 2005/0004990 A1 | 1/2005 | Durazo et al. | |
| 2005/0231758 A1 | 10/2005 | Reynolds | |
| 2006/0015804 A1 | 1/2006 | Barton et al. | |
| 2006/0167976 A1 | 7/2006 | Brown et al. | |
| 2007/0127064 A1 * | 6/2007 | Kuroshima | 358/1.15 |
| 2007/0273895 A1 | 11/2007 | Cudd et al. | |
| 2008/0086695 A1 | 4/2008 | Oral | |
| 2008/0137132 A1 | 6/2008 | Perronnin | |
| 2009/0063245 A1 | 3/2009 | Anderson | |
| 2009/0100374 A1 | 4/2009 | Sheasby et al. | |

(Continued)

OTHER PUBLICATIONS

"Final Office Action", U.S. Appl. No. 12/849,231, (Oct. 24, 2012), 11 pages.

(Continued)

*Primary Examiner* — Dennis Dicker
(74) *Attorney, Agent, or Firm* — Wolfe-SBMC

(57) ABSTRACT

A PDF document is repurposed to save paper and ink. Pre-processing is performed on the PDF document. The PDF document has a first quantity of pages of content and a first quantity of ink. Further, complexity analysis is performed on the PDF document. In addition, a document object model based on the PDF document is created. In addition, content re-layout is performed on the PDF document based on the content repurposing such that a printer prints the PDF document with the content in a transformed format that results in a second quantity of pages being printed without falling below a predetermined readability threshold and a second quantity of ink being utilized. The second quantity of pages is less than the first quantity of pages. The second quantity of ink is less than the first quantity of ink.

20 Claims, 8 Drawing Sheets

U.S. PATENT DOCUMENTS

| | | | |
|---|---|---|---|
| 2009/0119272 A1 | 5/2009 | Sastry | |
| 2009/0249193 A1 | 10/2009 | Hanechak | |
| 2010/0027051 A1 | 2/2010 | Hamilton, II et al. | |
| 2010/0123908 A1 | 5/2010 | Denoue et al. | |
| 2010/0188681 A1 | 7/2010 | Kawano | |
| 2010/0281351 A1 | 11/2010 | Mohammed | |
| 2011/0032562 A1 | 2/2011 | McCuen et al. | |
| 2011/0043831 A1* | 2/2011 | Sprague et al. | 358/1.2 |
| 2011/0145085 A1 | 6/2011 | Khachatrian et al. | |
| 2011/0235064 A1 | 9/2011 | Arai | |
| 2011/0273739 A1 | 11/2011 | Grasso et al. | |
| 2012/0033237 A1 | 2/2012 | Arora et al. | |

OTHER PUBLICATIONS

"Final Office Action", U.S. Appl. No. 12/849,349, (Oct. 24, 2012), 14 pages.

"Final Office Action", U.S. Appl. No. 12/849,475, (Aug. 20, 2012), 14 pages.

"Invent Wheel: Print What You Like Online Printing", retrieved from <http://www.inventwheel.com/web/articleDetailsByVersion.action?versionId=8> on Jan. 8, 2012 3 pages.

"Non-Final Office Action", U.S. Appl. No. 12/849,231, (May 21, 2012), 12 pages.

"Non-Final Office Action", U.S. Appl. No. 12/849,306, (Oct. 9, 2012), 11 pages.

"Non-Final Office Action", U.S. Appl. No. 12/849,349, (May 21, 2012), 14 pages.

"Non-Final Office Action", U.S. Appl. No. 12/849,417, (Dec. 5, 2012), 12 pages.

"Non-Final Office Action", U.S. Appl. No. 12/849,475, (Jan. 19, 2012), 12 pages.

"PrintWhatYouLike.com", retrieved from <http://www.printwhatyoulike.com/> on Aug. 2, 2010, 2 pages.

Frye, Curtis D., "Excel Annoyances: Print Layout Annoyances", retrieved from <academic.safaribooksonline.com/print?xmlid=0596007280/excelannoyances-CHP-7-SECT-2> on May 14, 2012, 18 pages.

Henry, Alan "Print Friendly for Chrome Lets You Easily Remove Unwanted Web Page Elements Before Printing", retrieved from <http://lifehacker.com5865826/print-friendly-for-chrome-lets-you-easily-remove-unwanted-web-page-elements-before-printing> on Jan. 8, 2012, (Dec. 7, 2011), 3 pages.

Remick, Jarel "Printing Pages with Print What You Like", retrieved from <http://web.appstorm.net/how-to/printing-pages-with-print-what-you-like/> on Jan. 8, 2012, 14 pages.

"Non-Final Office Action", U.S. Appl. No. 12/849,231, (Mar. 18, 2013), 14 pages.

"Non-Final Office Action", U.S. Appl. No. 12/849,349, (Mar. 18, 2013), 15 pages.

* cited by examiner

The Spider of the Cobweb – Understanding Web Crawlers

400

This one's about a very interesting little invention in computer science. But before we have a rendezvous with the idea itself, here's a short story to set things in motion. It's called the "connected man".

Max and Tom had lived together for four years. They were enrolled in different programs, though in the same university. They were cousins, and shared the apartment in the down-town area. But that's it. That's all they ever shared. Max was a quiet and shy guy who wouldn't bother a fly sitting on his nose, while Tom was like this radio that you could never turn off. Max was quite piqued by the amount of interest Tom generated in the city damsels'. What did they find so attractive in his noisy manner? For him Tom was like this little monster that had just one thing to do – blabber, and blabber some more. And what a successful monster he was! How did he manage to that? Max would ponder all day long. It was the question that haunted him. Do you know what the question is? How does a guy like Tom, who'd be thrown out of a debate competition for exceeding the time-limit for a speaker by a day or two, get to know so many

*Figure 4A*

This wasn't the least of his problems. There were other troubles. When he did fin[d] were either too short-tempered to listen to him, or just plain bores – the kind of lo[ng] meet. There was this shoemaker that he met one day at the local bar. "Hi! Care fo[r] approached him casually. He had a kind-looking face and a gray beard that gave [him] working man. "Go away! I hate people." Later, Tom found out that the only pers[on] ever talked with was the bartender. What was more intriguing was that the only p[erson] ever talked to was our bearded fellow. In other words, if you got to know one guy that you could connect to using him would be the other. A little viscous (vicious) polish and the wine it was. The city nice would rather stay in their holes, than ha[ve] them.

420

*Figure 4B* certain gentleman uptown who had a great liking for all but dairy and beef. The managed to get himself invited to his magnificent bungalow. Likewise, he found important people mention some other person, who wasn't exactly as distinguis that the person in question was either notoriously social in their company or wa thug. A little background study would tell Tom the real category to place the pe found out that certain individuals were authorities in the society, while others v connected.

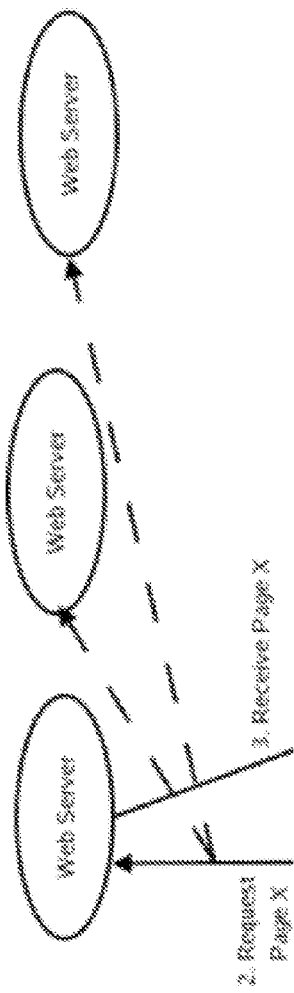

*Figure 4C*

The Spider of the Cobweb –
Understanding Web Crawlers

This one's about a very interesting little invention in computer science. But before we have a rendezvous with the idea itself, here's a short story to set things in motion. It's called the "connected man".

Max and Tom had lived together for four years. They were enrolled in different programs, though in the same university. They were cousins, and shared the apartment in the down-town area. But that's it. That's all they ever shared. Max was a quiet and shy guy who wouldn't bother a fly sitting on his nose, while Tom was like this radio that you could never turn off. Max was quite piqued by the amount of interest Tom generated in the city damsels'. What did they find so attractive in his noisy manner? For him Tom was like this little monster that had just one thing to do – blabber, and blabber some more. And what a successful monster he was! How did he manage to that? Max would ponder all day long. It was the question that haunted him. Do you know what the question is? How does a guy like Tom, he could even meet more people than he already knew. He thought about getting into the burglary business, but soon gave up the idea when he found out that the police no longer used rubber bullets. He tried working in a food store, but people just did not take notice of him. He even tried joining the local junkies but they told him he was too meek to join in with them. So he lay himself down on the bed one night and put his mind to work. How could he meet more people?

There were other troubles. When he did find people to talk to, they were either too short-tempered to listen to him, or just plain bores – the kind of loners he did *not* want to meet. There was this shoemaker that he met one day at the local bar. He dismissed Tom quite curtly. Later, Tom found out that the only person this bearded honcho ever talked with was the bartender. What was more intriguing was that the only person that the bartender ever talked to was our bearded fellow. In other words, if you got to know one guy, then the only person that you could connect to using him would be the other. He wanted to meet people who were either very well

*Figure 4D*

CONTENT-AWARE METHOD FOR SAVING PAPER AND INK WHILE PRINTING A PDF DOCUMENT

BACKGROUND

1. Field

This disclosure generally relates to printing. More particularly, the disclosure relates to the reduction of paper and/or ink utilized for printing.

2. General Background

Recent attempts have been made to make technology more environmentally friendly. The resulting technologies are typically called green technologies. For example, green technologies have been developed for computers, automobiles, household appliances, etc.

With respect to computing technologies, a significant environmental concern stems from the printing of paper. Computer users may use compute printers to print large quantities of various types of documents, which typically leads to the use of large amounts of paper. A large demand for paper may lead to the destruction of large quantities of trees, which may have a negative impact on the environment.

As a result, computer users are typically encouraged to reduce the amount of paper utilized for printing by scaling multiple pages down to fit on a single page. A problem with this approach is that the readability and aesthetics of the page are severely hampered. A user may have such a difficult time reading text that has been miniaturized so that two or more pages may fit on one side of a sheet of paper (the other side may also have two or more pages) that the user may simply choose not to utilize green printing and may print in the typical manner, which would not be environmentally friendly.

SUMMARY

In one aspect of the disclosure, a computer program product is provided. The computer program product includes a computer useable medium having a computer readable program. The computer readable program when executed on a computer causes the computer to preprocess a PDF document having a first quantity of pages of content. Further, the computer readable program when executed on a computer causes the computer to perform complexity analysis on the PDF document. In addition, computer readable program when executed on a computer causes the computer to create a document object model based on the PDF document. The computer readable program when executed on a computer also causes the computer to perform document object model analysis on the PDF document with the document object model. Further, computer readable program when executed on a computer causes the computer to perform content repurposing of the PDF document. In addition, the computer readable program when executed on a computer causes the computer to perform content re-layout of the PDF document based on the content repurposing such that a printer prints the PDF document with the content in a transformed format that results in a second quantity of pages being printed without falling below a predetermined readability threshold, the second quantity of pages being less than the first quantity of pages.

In another aspect of the disclosure, a process is provided. The process preprocesses, with a processor, a PDF document having a first quantity of pages of content. Further, the process performs, with the processor, complexity analysis on the PDF document. In addition, the process creates, with the processor, a document object model based on the PDF document. The process also performs, with the processor, document object model analysis on the PDF document with the document object model. Further, the process performs, with the processor, content repurposing of the PDF document. In addition, the process performs, with the processor, content re-layout of the PDF document based on the content repurposing such that a printer prints the PDF document with the content in a transformed format that results in a second quantity of pages being printed without falling below a predetermined readability threshold, the second quantity of pages being less than the first quantity of pages.

In yet another aspect of the disclosure, a system is provided. The system includes a green print module that receives an indication that a printout of a PDF document from a printer has been requested. The PDF document has content with a format that would result in a first quantity of pages being printed. Further, the system has a processor that (i) preprocesses the PDF document, (ii) perform complexity analysis on the PDF document, (iii) creates a document object model based on the PDF document, (iv) performs document object model analysis on the PDF document with the document object model, (v) performs content repurposing of the PDF document by utilizing the document object model, and (vi) performs content re-layout of the PDF document based on the content repurposing such that a printer prints the PDF document with the content in a transformed format that results in a second quantity of pages being printed without falling below a predetermined readability threshold. The second quantity of pages being less than the first quantity of pages.

DRAWINGS

The above-mentioned features of the present disclosure will become more apparent with reference to the following description taken in conjunction with the accompanying drawings wherein like reference numerals denote like elements and in which:

FIG. 4A illustrates an example of a first page of a PDF document.

FIG. 4B illustrates an example of a second page of the PDF document.

FIG. 4C illustrates an example of a third page of the PDF document.

FIG. 4D illustrates a PDF green document that results from the process illustrated in FIG. 3 being applied to the first page, second page, and third page of the PDF document.

DETAILED DESCRIPTION

Figure 1:
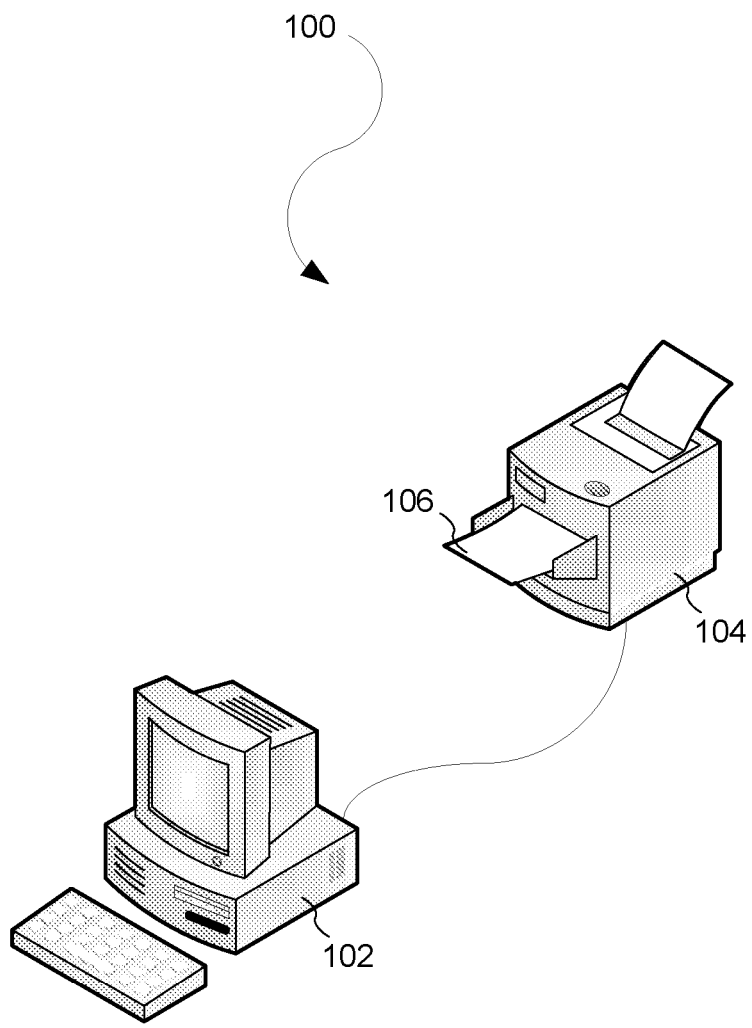
FIG. 1 illustrates a green printing configuration.

A green printing configuration is provided herein that repurposes a PDF document to save paper and/or ink. The green printing configuration is a configuration that reduces the number of pages and/or ink utilizing to print a PDF document through content repurposing, which is an approach that transforms content and the formatting of the content to shrink the size of the content to fit into fewer pages at the same time as retaining the readability and aesthetics of the document. The green printing configuration may be a method, system, computing device, computer program stored on a computing device, computer program stored on a printer, computer module that may be downloaded through a network, plug-in, extension, etc. In one embodiment, a user may print in a single click to a default printer so that the content takes up fewer pages less ink than a typical printed document.

A PDF document may have text, images, and vector arts as primary building blocks. These objects are placed on pages in a PDF in a static fashion. A PDF file is typically difficult to modify as the entire content in the PDF file is placed content with fixed positions and the relationship between content spread across pages does not exist. For example, paragraphs or tables spanning multiple pages are treated as separate objects. The present of content such as footer text makes relating the objects more difficult. Accordingly, in the context of printing, the single biggest redundancy in a PDF document is that content from one page cannot flow into content from another page. As a result, large vacant spaces present in PDF pages remain unutilized on paper.

Other forms of redundant white space may also be present in PDF pages. These other forms of redundant white space include margins, gaps between objects, etc.

The green printing configuration exploits redundant whitespace and large text/Images present in a PDF document to reduce paper and ink for printing the PDF document. Further, the green printing configuration determines a relationship between objects that should be placed together. In one embodiment, content repurposing is utilized to automatically shrink content in a PDF document. The logical structure is extracted form the input PDF file with a heuristic rule model. A re-layout is performed on the logical structure after applying green transformations. The green transformations may include changing the page orientation, reducing text sizes, scaling images, flowing content from one page into another (e.g., disregarding page boundaries), and/or removal of unimportant content such as a cover page, header/footer, background fills, etc. In one embodiment, graying of text and images may be utilized to save ink for printing.

The transformations utilized for content repurposing have the goal of reducing the overall redundancy in a document. Although a group of transformations together may reduce the redundancy, one or more of the transformations may individually increase the redundancy. The redundancy for an individual transformation may be increased to accentuate certain characteristics of the document to add to the aesthetic appeal and/or readability of the document. For example, if and when a document is printed with multiple pages per paper sheet, a green print program may automatically decide to increase the size of the text to make the text more readable.

A transformation may have a magnitude associated therewith. In one embodiment, the magnitude may be binary. The binary magnitude may indicate whether a transformation is applied is or not applied, e.g., "0" equals transformation is not to be applied and "1" equals transformation is to be applied. In another embodiment, the magnitude may have a set of predefined discrete values. In another embodiment, the magnitude may take continuous values.

Each instance of a transformation type may have a transformation cost associated therewith for a particular document type. In other words, a particular sizing transformation may have a different transformation cost for a PDF document than for a spreadsheet.

Further, each transformation may have an associated saved paper quantity. For example, a particular textual transformation may save one tenth of a sheet of paper. In addition, each transformation may have an associated saved ink quantity. For example, a particular textual transformation may save one half an ounce of ink. The transformation may potentially have both a saved paper quantity and a saved ink quantity if both paper and ink would be saved as a result of the transformation.

FIG. 1 illustrates a green printing configuration 100. As an example, a computing device 102 is illustrated as a PC. Further, as an example, the computing device 102 is operably connected to a printer 104 through a wireline connection. The term computing device 102 is herein intended to include a personal computer ("PC"), desktop computer, laptop, notebook, cell phone, smart phone, personal digital assistant ("PDA"), kiosk, etc. Further, the computing device 102 may be a client, server, network device, etc. The printer 104 may be a printing device that is separately connected, e.g., through a wireline or wireless connection, to the computing device 102, built into the computing device 102, etc. A wireless connection may receive and/or send data through a Radio Frequency ("RF") transmission, an Infrared ("IR") transmission, or the like. The printer 104 may or may not be part of a network. Further, the printer 104 may utilize any type of printing methodology to print on paper 106, e.g. laser printing, ink jet printing, or the like.

Figure 2:
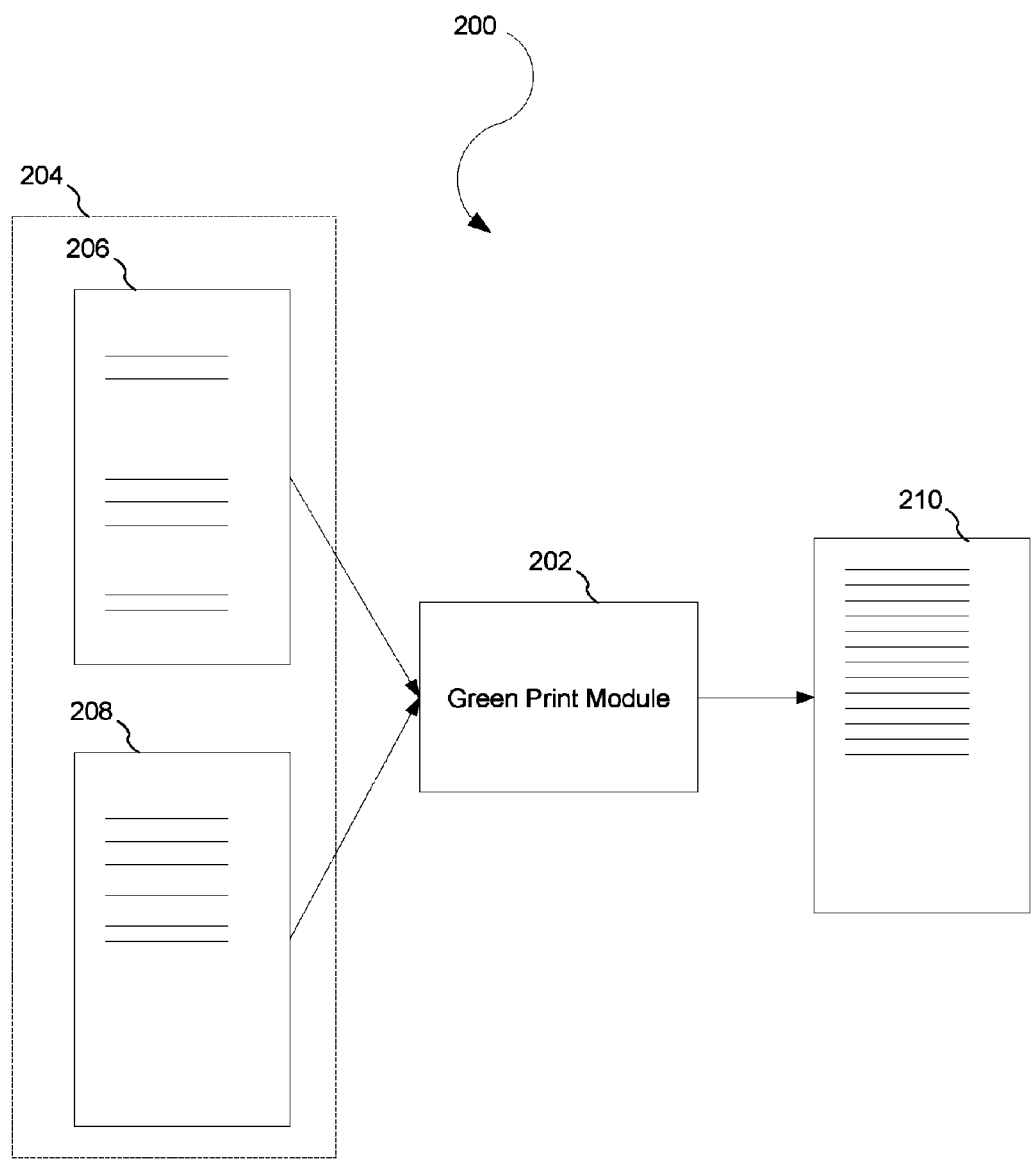
FIG. 2 illustrates a green print module that may be utilized with the green printing configuration.

FIG. 2 illustrates a green print module 202 that may be utilized with the green printing configuration 100. The green print module 202 may be stored in the computing device 102 or the printer 104. The green print module 202 may analyze the content of multiple pages, sections, etc. of a PDF document to repurpose the content to save paper and/or ink. For example, the green print module 202 may analyze a first page 206 and a second page 208 of a PDF document 204. The green print module 202 may then repurpose the content of the PDF document 204 so that a green PDF document 210 may be printed. The green PDF document 210 has a repurposed page 210 that has the content from the first page 206 and the second page 208 in a readable format. Lines are provided in a document as illustrated in drawings such as FIG. 2 to represent text, symbols, shapes, images, and/or the like.

Figure 3:
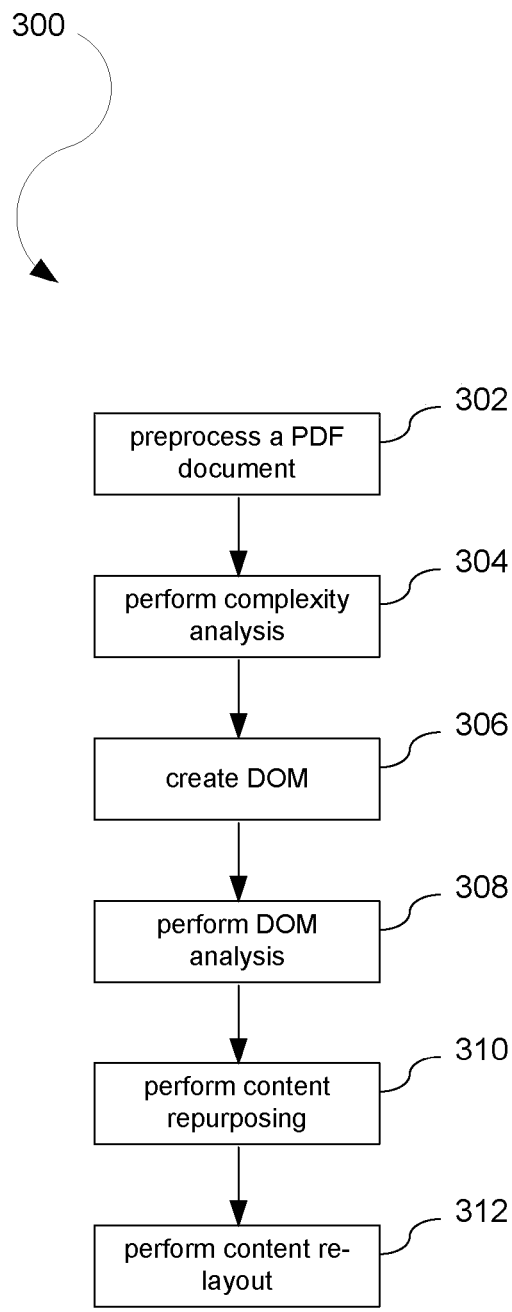
FIG. 3 illustrates a process that is utilized by the green print module illustrated in FIG. 2 to analyze a PDF document for the purpose of selecting one or more transformations to the PDF document for green printing.

FIG. 3 illustrates a process 300 that is utilized by the green print module 202 illustrated in FIG. 2 to analyze a PDF document for the purpose of selecting one or more transformations to the PDF document for green printing. At a process block 302, the process 300 preprocesses a PDF document. The pre-processing acquires information about the PDF document. The information may include identifying text, images, vector objects, dimensions (bounding boxes), text fonts, etc. These elements can be represented in a page as cells of well defined bound boxes. These cells may be grouped together to maintain the reading context of the individual element/cell. For example, overlapping vector graphics cells may be grouped together so that they can be formatted individually and placed in their entirety. Otherwise, in the re-layout phase the individual objects may be placed far apart, which may lead a less readable output. Similarly, original multicolumn text cells may be identified and merged in to a single text cell containing the entire multicolumn text in reading order. The preprocessing determines how many pages may be saved in the PDF document to figure out whether or not the number of pages should be reduced. For example, if the PDF document has only one page, then the green printing configuration will only save ink.

In one embodiment, a subprocess may be utilized to identify the cell groups. The subprocess may find the set of isolated cells (bounding boxes) B in the PDF page. Further, the subprocess may group the cells in B by utilizing heuristic rules which output the logical elements in the page. For every cell C in B, the subprocess groups the cells in B utilizing heuristic rules, which output the logical elements in the PDF page. For every cell C in B, the set of cells B' that lies in the proximity of C is found. The cells in B' can either lie in horizontal proximity or in vertical proximity. A plurality of factors may be utilized to make the decision as to which cells are chosen. The type of individual cells is a factor. For example, text cells will be merged with the graphic cells, e.g., image/vector arts, only when the text cells overlap with the graphic cells. Similarly, graphic cells can be merged with text cells even if they don't overlap with text cells, but lie in a small proximity. Another factor is that a merged cell should not contain empty areas beyond a certain threshold. Yet another factor is that multi-column text cells should not be merged as is, but rather in a single text cell in which all the text of individual cells should be added in the reading order.

The subprocess creates a merged cell merged(C). For every region C' in B, a determination is made to figure out whether or not C' was merged with merged cell merged(C). If C' was merged with merged cell merged(C), C' is removed from B. Further, the subprocess removes C from B. In addition, the subprocess adds the new merged cell merged(C) to B. After the initial finding of isolated cells, the subprocess repeats the remaining portions of the subprocess for every other cell present in the set B.

Further, at a process block 304, the process 300 performs a complexity analysis. The grouped cells are utilized to categorize certain pages and some content elements as being too complex for complete transformation. Certain rules are utilized for such categorization, e.g. the number of overlapped images/vectors in a given PDF page, presence of form field, etc. Such pages are typically converted to raster and replaced. This mechanism of complexity analysis also ensures the correctness of the entire green printing of PDF document approach.

The preprocessing allows the subprocess to find out the source of the document. For example, if the document that was converted to a PDF was a word processing document rather than a spreadsheet program, then one type of green transformations are utilized for a word processing document.

Further, the process 300 advances to a process block 306 to create a document object model ("DOM"). A PDF document is generally not created by keeping any specific document structure in mind. However, a tagged PDF provides some information in terms of logical constructs such as a table of contents, paragraph, tables, drawing, etc. Accordingly, the creation of the DOM model first involves tagging the input PDF if the PDF is not already tagged. Subsequently, higher level constructs such as cover page, reference page, background image, etc. will be identified utilizing a heuristic rule based model. The grouped cells identified at the process block 302 will be tagged as high level document constructs utilizing this rule model. These constructs will be considered while applying a transformation.

This structure creation is helpful because a PDF document inherently does not support any document structure or any relationship between different objects. Therefore, a high level flow able structure is created to be utilized in content re-layout. This structure extraction is not same as object recognition in images, etc. Semantic tags are applied that are helpful in printing. For example, a group of vector paths may not necessarily be a single diagram, but is labeled so, because the label helps in placing all the vector arts together while laying out the output pages.

In addition, the process 300 advances to a process block 308 to perform DOM analysis. Certain entities are identified in the PDF document. As examples, the process 300 may identify page labels and object labels. A page label may be a page that is labeled as a cover page, table of contents page, content page, reference/index page, etc. An object label may be a PDF object in a page that is labeled as a header/footer, paragraph, main heading, sub heading, figure/background, table, figure/table caption, etc. These provide a way to control the formatting of content in the output. For example, headings and table/figure captions on all output pages need to be have the same font size so that the overall appearance of the output is consistent. In one embodiment, heuristic rules are utilized to identify these entities. The heuristic rules are based on characteristics such as sequence of appearance for pages, location on the page, and relative text sizes for objects only containing text. The base probabilities for these characteristics for each of the entities may be determined by analyzing large number of real world PDF files to create a training data set.

In one embodiment, a subprocess that labels given pages/objects takes a set of rules R ($R_1 \ldots R_k$) such that each jth rule provides a basic success probability $P(R_j)$. For example, if a rule $R_j$ for any construct C is computed as successful, that rule $R_j$ will increase the probability of identifying that PDF object as construct C by $P(R_j)$. The document construct identification (Page level/Object level) may be performed as follows. The set of rules that identifies an input document construct C is found. For every rule C' in C, a determination is made as to whether or not the rule is successful for the given page/cells. If the rule is successful for the given page/cells, then $P_c$ (Probability of the given page/cells to be C)+=P(Cs). Further, if $P_c$>threshold and C is an object level rule, all the individual cells are grouped into a single cell and the grouped cell is marked as C. Otherwise if $P_c$>threshold and C is an Page level rule, the input page is marked as C. After the subprocess is completed, all the cells identified at the process block 302 will be tagged as high level document constructs, which will be transformed to create a green PDF.

The process 300 then advances to a process block 310 to perform content repurposing. Certain green transformations are applied on the document constructs. For example, a paragraph may have some text with large font size, color, and large blank line space. The font size is reduced by analyzing all the font sizes present in the PDF document and normalizing them. Also line spacing may be reduced without affecting the readability of the paragraph.

Similarly to save ink, some graying transformations may be performed. Since PDF as a document format supports multiple color spaces, this property may be utilized to save ink in printing already grayed content which contains grey color values in RGB color space as R=G=B color values. When such content is printed on paper, RGB color values are converted in to CMYK color space. The CMYK is a subtractive color model that is utilized in color printing and refers to the four inks utilized in color printing: cyan, magenta, yellow, and black. Printing CMYK colors for gray colors consumes all ink toners present in the printer to represent the correct grey color. This consumption can be avoided in PDF by converting RGB color space to CMYK as a green transformation. All the grey content with R=G=B color representation is then converted into a single K value. After this transformation, grey content will consume only K toner on printers which is already does not support under color removal.

Finally, the process 300 advances to a process block 312 to perform content re-layout. The content re-layout decides the final placement of the content in the output. In one embodiment, a special re-layout engine may be utilized to convert the high level constructs in to concrete PDF objects and to perform all necessary scaling. The re-layout engine may also take placement decisions for the output. The content re-layout also reduces the vertical gaps between objects, manages bounding boxes, etc. The content re-layout also attempts to fully utilize the pages that the content will occupy eventually, i.e., fit-to-page. As a result of the content re-layout, a green PDF document is created.

In one embodiment, a user may provide an input such as selecting a button to only save ink. In another embodiment, the user may provide an input such as selecting a button to only save paper. In yet another embodiment, the user may provide an input such as selecting a button to save both ink and paper.

FIG. 4A illustrates an example of a first page 400 of a PDF document. Further, FIG. 4B illustrates an example of a second page 420 of the PDF document. FIG. 4C illustrates an example of a third page 440 of the PDF document. Finally, FIG. 4D illustrates a PDF green document 460 that results from the process 300 illustrated in FIG. 3 being applied to the first page 400, second page 420, and third page 440 of the PDF document.

Figure 5:
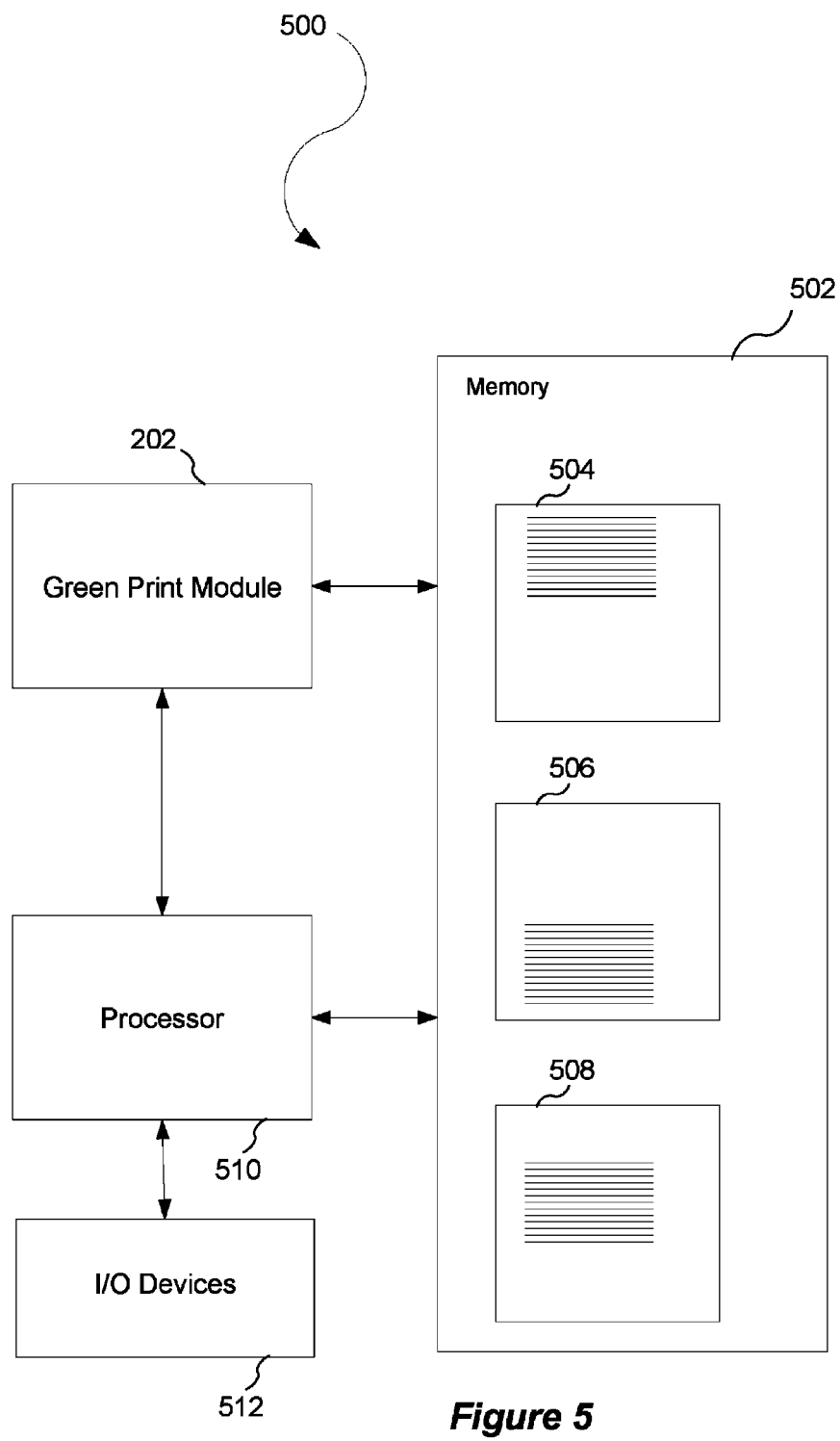
FIG. 5 illustrates a system configuration that may be utilized for green printing of a PDF document.

FIG. 5 illustrates a system configuration 500 that may be utilized for green printing of a PDF document. In one embodiment, the green print module 202 interacts with a memory 502. The green print module 202 generates a variety of potential repurposed documents that meet a readability threshold. For example, a first potential repurposed PDF document 504 may have text according to one format that meets the readability threshold, a second potential repurposed document 506 may have text according to another format that meets the readability threshold, and a third potential repurposed document 508 may have text according to yet another format that meets the readability threshold. The green print module 202 may select one final repurposed document from these potential repurposed documents by utilizing a repurposing quantifier. The repurposing quantifier may be the result of an equation that is based on the number of pages reduced and the degradation of the readability. Even if all of the potential repurposed documents meet the readability threshold, a higher score will generally be given to a first repurposed document that degrades readability less than a second repurposed document with the same number of reduced pages. Further, even if all of the potential repurposed documents meet the readability threshold, a higher score will generally be given to a first repurposed document that reduces more pages than a second repurposed document with the same readability degradation. In other words, the highest score will be given to the potential repurposed document that as a whole minimizes readability degradation and maximizes page reduction better than the other potential repurposed documents.

After the green print module 202 selects a potential repurposed document, the green print module 202 provides the repurposed PDF document to a processor 510. Further, the processor 510 applies the transformations in the potential repurposed document to the document so that the user may print the final repurposed document. The processor 510 interacts with input/output ("I/O") devices 512. For example, the processor 1012 receives an input from a user through a keyboard to print the document. The processor 1012 may then print the repurposed document on a printer.

In another embodiment, a green score may be indicated for a PDF document. The system configuration 100 may inform a user how green the PDF document is by utilizing any of the scoring methodologies described herein. In other words, a display device may provide a user with an indication of what changes the user can make to the PDF document to save paper and/or ink. The indication may be provided during the user's editing of the PDF document. Alternatively, the indication may be provided to the user when the user is not editing the PDF document.

In one embodiment, the system configuration 500 is suitable for storing and/or executing program code and is implemented using a general purpose computer or any other hardware equivalents. The processor 510 is coupled, either directly or indirectly, to the memory 1002 through a system bus. The memory 502 can include local memory employed during actual execution of the program code, bulk storage, and/or cache memories which provide temporary storage of at least some program code in order to reduce the number of times code must be retrieved from bulk storage during execution.

The I/O devices 512 can be coupled directly to the system 1000 or through intervening input/output controllers. Further, the I/O devices 512 can include a keyboard, a keypad, a mouse, a microphone for capturing speech commands, a pointing device, and other user input devices that will be recognized by one of ordinary skill in the art. Further, the I/O devices 512 can include output devices such as a printer, display screen, or the like. Further, the I/O devices 512 can include a receiver, transmitter, speaker, display, image capture sensor, biometric sensor, etc. In addition, the I/O devices 512 can include storage devices such as a tape drive, floppy drive, hard disk drive, compact disk ("CD") drive, etc.

Network adapters may also be coupled to the system configuration 500 to enable the system configuration 500 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes and systems. Therefore, it is to be understood that, within the scope of the appended claims, the present processes and systems may be practiced other than as specifically described herein.

We claim:

1. A computer readable device having a computer readable program, wherein the computer readable program when executed on a computer causes the computer to:
preprocess a PDF document having a first quantity of pages of content;
perform complexity analysis on the PDF document;
create a document object model based on the PDF document;
perform document object model analysis on the PDF document with the document object model;
perform content repurposing of the PDF document;
perform content re-layout of the PDF document based on the content repurposing such that a printer prints the PDF document with the content in a transformed format that results in a second quantity of pages being printed without falling below a predetermined readability threshold, the second quantity of pages being less than the first quantity of pages.

2. The computer readable device of claim 1, wherein the preprocessing includes acquiring data associated with the PDF document that provides identification of at least one portion of the PDF document.

3. The computer readable device of claim 1, wherein the preprocessing includes a determination of a potential page savings.

4. The computer readable device of claim 1, wherein the complexity analysis determines if a page in the PDF document surpasses a complexity threshold for complete transformation.

5. The computer readable device of claim 1, wherein the complexity analysis determines if a set of content elements in the PDF document surpasses a complexity threshold for complete transformation.

6. The computer readable device of claim 1, wherein the computer is further caused to perform tagging to identify one or more logical constructs in the PDF document.

7. The computer readable device of claim 1, wherein the computer is further caused to reduce the quantity of ink such that a second quantity of ink utilized in printing the PDF is less than a first quantity of ink that would have been utilized in printing the PDF.

8. A method comprising:
preprocessing, with a processor, a PDF document having a first quantity of pages of content;
performing, with the processor, complexity analysis on the PDF document;
creating, with the processor, a document object model based on the PDF document;
performing, with the processor, document object model analysis on the PDF document with the document object model;
performing, with the processor, content repurposing of the PDF document; and
performing, with the processor, content re-layout of the PDF document based on the content repurposing such that a printer prints the PDF document with the content in a transformed format that results in a second quantity of pages being printed without falling below a predetermined readability threshold, the second quantity of pages being less than the first quantity of pages.

9. The method of claim 8, wherein the preprocessing includes acquiring data associated with the PDF document that provides identification of at least one portion of the PDF document.

10. The method of claim 8, wherein the preprocessing includes a determination of a potential page savings.

11. The method of claim 8, wherein the complexity analysis determines if a page in the PDF document surpasses a complexity threshold for complete transformation.

12. The method of claim 8, wherein the complexity analysis determines if a set of content elements in the PDF document surpasses a complexity threshold for complete transformation.

13. The method of claim 8, further comprising performing tagging to identify one or more logical constructs in the PDF document.

14. The method of claim 8, further comprising reducing the quantity of ink such that a second quantity of ink utilized in printing the PDF is less than a first quantity of ink that would have been utilized in printing the PDF.

15. A system comprising:
a green print module that receives an indication that a printout of a PDF document from a printer has been requested, the PDF document having content with a format that would result in a first quantity of pages being printed; and
a processor that (i) preprocesses the PDF document, (ii) performs complexity analysis on the PDF document, (iii) creates a document object model based on the PDF document, (iv) performs document object model analysis on the PDF document with the document object model, (v) performs content repurposing of the PDF document by utilizing the document object model, and (vi) performs content re-layout of the PDF document based on the content repurposing such that a printer prints the PDF document with the content in a transformed format that results in a second quantity of pages being printed without falling below a predetermined readability threshold, the second quantity of pages being less than the first quantity of pages.

16. The system of claim 15, wherein the preprocessing includes acquiring data associated with the PDF document that provides identification of at least one portion of the PDF document.

17. The system of claim 15, wherein the preprocessing includes a determination of a potential page savings.

18. The system of claim 15, wherein the complexity analysis determines if a page in the PDF document surpasses a complexity threshold for complete transformation.

19. The system of claim 15, wherein the complexity analysis determines if a set of content elements in the PDF document surpasses a complexity threshold for complete transformation.

20. The system of claim 15, wherein the processor performs tagging to identify one or more logical constructs in the PDF document.

* * * * *